(12) United States Patent
Bauer

(10) Patent No.: US 11,187,311 B2
(45) Date of Patent: Nov. 30, 2021

(54) AXLE CENTER TRANSMISSION

(71) Applicant: Kessler & Co. GmbH & Co. KG, Abtsgmund (DE)

(72) Inventor: Thomas Bauer, Dewangen (DE)

(73) Assignee: KESSLER & CO. GMBH & CO. KG, Abtsgmünd (DE)

( * ) Notice: Subject to any disclaimer, the term of this patent is extended or adjusted under 35 U.S.C. 154(b) by 0 days.

(21) Appl. No.: 16/789,673

(22) Filed: Feb. 13, 2020

(65) Prior Publication Data

US 2020/0256439 A1 Aug. 13, 2020

(30) Foreign Application Priority Data

Feb. 13, 2019 (DE) .......................... 102019103613.5

(51) Int. Cl.
*F16H 37/08* (2006.01)
*F16H 57/04* (2010.01)

(52) U.S. Cl.
CPC ......... *F16H 37/082* (2013.01); *F16H 57/043* (2013.01); *F16H 57/0486* (2013.01)

(58) Field of Classification Search
CPC .......................... F16H 2200/2007–2017; F16H 2200/2035–2061; F16H 2200/0034–2200/0082; F16H 37/065; F16H 2037/048; F16H 57/04–0434
See application file for complete search history.

(56) References Cited

U.S. PATENT DOCUMENTS 3,811,343 A * 5/1974 Mori .......................... F16H 3/66
475/285
5,910,063 A * 6/1999 Kato ................... F16H 57/0427
475/159

(Continued)

FOREIGN PATENT DOCUMENTS

CN 103557312 A 2/2014
DE 3415773 A1 10/1985
(Continued)

OTHER PUBLICATIONS

Truebenbach, raw translation of DE102013226474 "Getriebe", 2015, (Year: 2015).*

*Primary Examiner* — Ernesto A Suarez
*Assistant Examiner* — Lillian T Nguyen
(74) *Attorney, Agent, or Firm* — Dickinson Wright PLLC

(57) ABSTRACT

An axle center transmission includes a transmission gearing for transmitting a driving torque received at an input element and having at least two selectively switchable gear transmission ratios and a differential for distributing the transmitted driving torque to two output elements. The transmission gearing has a first gear that is formed as a planetary transmission and comprises a first sun gear, a first planet carrier having one or more planet gears, and a first annulus gear. The transmission gearing furthermore has a second gear that is formed as a planetary transmission and comprises a second sun gear, a second planet carrier having one or more planet gears, and a second annulus gear. The first sun gear forms said input element; the first planet carrier is stationary; and the second sun gear is couplable or coupled to the first annulus gear for a common rotation.

20 Claims, 3 Drawing Sheets

(56) References Cited

U.S. PATENT DOCUMENTS

| | | | |
|---|---|---|---|
| 8,663,051 B2* | 3/2014 | Sten | F16H 48/36 |
| | | | 475/205 |
| 2003/0027680 A1 | 2/2003 | Wildeshaus | |
| 2004/0176203 A1* | 9/2004 | Supina | B60W 10/06 |
| | | | 475/8 |
| 2013/0196807 A1* | 8/2013 | Ziemer | F16H 3/725 |
| | | | 475/5 |
| 2017/0204942 A1* | 7/2017 | Iuchi | B61C 9/00 |
| 2018/0126845 A1 | 5/2018 | Tsukamoto | |
| 2018/0266490 A1* | 9/2018 | Muramatsu | F16H 57/0471 |
| 2020/0262293 A1* | 8/2020 | Gluckler | B60K 17/046 |

FOREIGN PATENT DOCUMENTS

| | | |
|---|---|---|
| DE | 19945089 A1 | 3/2001 |
| DE | 102010050217 A1 | 5/2012 |
| DE | 102011088668 A1 | 6/2013 |
| DE | 102012217314 A1 | 3/2014 |
| DE | 102013222847 A1 | 5/2015 |
| DE | 102013226474 A1 | 6/2015 |
| DE | 102016120971 A1 | 5/2017 |
| EP | 0575226 A1 * 12/1993 | ........... B60K 17/165 |

* cited by examiner

AXLE CENTER TRANSMISSION

CROSS-REFERENCES TO RELATED APPLICATIONS

This patent application claims the benefit of priority to German Patent Application No. 102019103613.5 filed Feb. 13, 2019, which are incorporated herein by reference in their entirety.

The present invention relates to an axle center transmission for transmitting a driving torque received from a drive device to two half shafts of an axle of a vehicle.

Such an axle center transmission can in particular comprise a differential for distributing a respective driving torque to the two half shafts (also known as split axles). In this respect, depending on the application and in particular depending on the kind of drive device from which the axle center transmission receives a driving torque, it can be expedient first to step down the driving torque or to step it up before it reaches the differential. Provision can, for example, be made when the drive device is an electric motor or another motor/engine having a high number of revolutions that the driving torque is first stepped down to a lower number of revolutions.

An exemplary application for such an axle center transmission is a vehicle that has one or more permanently driven drive axles, in particular driven by an internal combustion engine, and at least one selectively engageable drive axle that is driven by an electric motor whose driving torque is stepped down via an axle center transmission and is distributed to two half shafts of the engageable drive axle, in particular to implement a selectively engageable all-wheel drive. Said drive axle does not, however, necessarily have to be engageable, but can rather also be permanently driven, for instance for a permanent all-wheel drive. The vehicle can, for example, be a fire engine or an off-road utility vehicle.

It is advantageous for a flexible use in different speed ranges if the driving torque output by the respective drive device can be changed, in particular stepped down, by different amounts. Different gear transmission ratios can be implemented, for example, by switchable wheel hub transmissions. It is in particular advantageous for axles with independent wheel suspension and/or for vehicles having small clearance as well as for drive devices having particularly large numbers of revolutions if different gear transmission ratios can already be achieved in the axle center transmission. For this purpose, a transmission gearing (also known as a step-up gear unit) for stepping up the driving torque can be arranged upstream of the differential and can have at least two selectively switchable gear transmission ratios so that the differential then receives an already stepped up driving torque and distributes it to two output elements that can each be connected to a respective half shaft of the axle to be driven.

Such an axle center transmission then comprises both a differential and a transmission gearing, but should nevertheless have a design shape that is as compact as possible. The cooling and lubrication of the components of the axle center transmission are, however, here made more difficult by a compact design shape since there is only a little space available for the lubricant conveying.

It is an object of the invention to provide an axle center transmission of the initially named kind, an axle drive having such an axle center transmission, and a drive axle having such an axle center transmission that each enable at least two selectively switchable gear transmission ratios, a compact design shape, and a comparatively simple, but reliable, lubrication and cooling.

The object is satisfied by an axle center transmission, by an axle drive, and by a drive axle having the features of the independent claims. Advantageous embodiments result from the dependent claims, the present description, and the Figures.

The axle center transmission in accordance with the invention for transmitting a driving torque received from a drive device to two half shafts of an axle of a vehicle comprises a transmission gearing for transmitting a driving torque received at an input element and having at least two selectively switchable gear transmission ratios and a differential for distributing the transmitted driving torque to two output elements. An electric motor can here preferably be considered as the drive device. The two gear transmission ratios can in principle each result from a stepping up, that is to a higher number of revolutions, from a stepping down, i.e. a change to a slower speed, that is to a smaller number of revolutions, or also from a 1:1 gear transmission ratio. The at least two gear transmission ratios of the step-down gear are different from one another in this respect. In particular when the drive device from which the axle center transmission receives the driving torque is an electric motor with a high number of revolutions, the at least two gear transmission ratios are preferably each not a stepping up, but rather with at least one of the gear transmission ratios, preferably with all of the switchable gear transmission ratios, a respective stepping down.

The input element at which the driving torque is received that is then transmitted by the transmission gearing and output to the differential can be considered an input element of the transmission gearing and can furthermore simultaneously form an input element of the axle center transmission. The input element of the transmission gearing and the input element of the axle center transmission can, however, in principle also be formed by different components between which one or more further components can be interposed that drive effectively connect the two input elements to one another.

The output elements to which the differential distributes the transmitted driving torque received from the transmission gearing can be considered output elements of the differential and can furthermore simultaneously form output elements of the axle center transmission. The output elements of the differential and the output elements of the axle center transmission can, however, in principle also be formed by different components between which one or more further components can be interposed that drive effectively connect the output elements of the differential and the output elements of the axle center transmission elements to one another.

The differential can be formed in a generally known manner. The differential can in particular be a pinion gear differential having a differential cage, one or more compensation pinions gears, preferably four compensation pinion gears, and two output pinion gears. A crown wheel provided at the differential cage can then form the input element of the differential. The output pinion gears or output shafts connected thereto can form said output elements of the differential or of the axle center transmission. The differential can, however, also be formed as a planetary transmission or in another manner to distribute a received driving torque to at least two output elements.

The transmission gearing has a first gear that is formed as a planetary transmission and comprises a first sun gear, a first planet carrier having one or more planet gears, and a first annulus gear. The interaction of these elements of the planetary transmission in principle corresponds to the typical function of planetary transmissions. The first sun gear, the first planet carrier, and the first annulus gear are here in particular arranged coaxially rotatably about an axis of rotation, while the planet gears are rotatably supported eccentrically to said axis of rotation at the first planet carrier. In this respect, the planet gears each have an outer toothed arrangement that rolls off at an outer toothed arrangement of the first sun gear and/or at an inner toothed arrangement of the first annulus gear.

The transmission gearing furthermore has a second gear that is formed as a planetary transmission and comprises a second sun gear, a second planet carrier having one or more planet gears, and a second annulus gear. As in the first gear, the interaction of the elements of the planetary transmission also corresponds in principle to the typical function of planetary transmissions in the second gear. The second sun gear, the second planet carrier, and the second annulus gear are here in particular arranged coaxially rotatably about an axis of rotation, while the planet gears are rotatably supported eccentrically to said axis of rotation at the second planet carrier. In this respect, the planet gears each have an outer toothed arrangement that rolls off at an outer toothed arrangement of the second sun gear and/or at an inner toothed arrangement of the second annulus gear.

The axis of rotation of the planetary transmission forming the first gear and the axis of rotation of the planetary transmission forming the second gear preferably coincide, with the two gears, however, being arranged axially offset from one another.

The designation of the one gear as the first gear and of the other gear as the second gear serves a simple distinction of terms and does not generally imply either that more than two gears have to be provided or a specific order or hierarchy between the respectively provided gears. The same applies accordingly to the designations of the elements of the gears as the first or second sun gear, the first or second planet carrier, and the first or second annulus gear.

Provision is made in accordance with the invention that the first sun gear forms said input element and the first planet carrier is stationary. A fixed gear transmission ratio between the first sun gear at which the driving torque is received and the first annulus gear can be achieved in this manner by the first gear. The switchability between two different gear transmission ratios can then be achieved in the simplest case in that either the first sun gear or the first annulus gear is selectively used as the output element of the first gear so that either a 1:1 ratio or said fixed gear transmission ratio can be switched in the first gear. Since, however, a second gear arranged downstream of the first gear is also provided, the second gear can alternatively or additionally also be switchable between two gear transmission ratios. A stepping down that is greater overall than with a single gear can be achieved by the provision of two gears since the driving torque can enter into the second gear at an input revolution speed already reduced by the first gear and can be stepped down even further there.

Particular advantages of the design of the axle center transmission in accordance with the invention in particular result from the first planet carrier being stationary, i.e. the first planet carrier being rotationally fixedly arranged and thus in particular not being able to rotate relative to a housing of the transmission gearing or the total axle center transmission about the axis of rotation of the planetary transmission about which the first sun gear and the first annulus gear are rotatable. The first planet carrier is rather preferably fixedly connected to such a housing or is even configured as part of such a housing. Due to the fixed position first planet carrier, the planet gears supported at the first planet carrier only rotate about themselves, but not additionally about said axis of rotation of the planetary transmission. No centrifugal force influences with respect to said axis of rotation thereby act on the planets so that simpler bearings can be used for the support of the planets at the first planet carrier instead of more complex and/or expensive crankshaft bearings even at high peripheral speeds of the toothed wheels.

Further advantages result from the stationary planet carrier being able to extend axially through the first gear with respect to said axis of rotation of the planetary transmission. It can in this manner be fixedly anchored at the one side of the first gear and, as a stationary component, can provide a reliable support of further components, in particular of a second gear, at the other side. The stationary first planet carrier can furthermore also be used, actually due to its stationary design, as a basic structure for a comparatively simple and thereby particularly reliable lubricant conveying as will be explained in even more detail in the following. It can in particular thereby be achieved that no complex rotary leadthroughs or the like have to be provided.

Provision is furthermore made in accordance with the invention that the second sun gear is couplable or coupled to the first annulus gear for a common rotation. In other words, coupling means are provided at the axle center transmission to couple the first annulus gear and the second sun gear to one another for a common rotation as required or permanently.

On a coupling of the second sun gear to the first annulus gear for a common rotation, these components have a clear drive relationship, namely a fixed speed ratio. The second sun gear and the first annulus gear can in particular be rotationally fixedly coupled to one another (i.e. coupled for common rotation) so that they always have the same number of revolutions. The second sun gear and the first annulus gear are preferably even formed in one part, i.e. as a single component with an annulus gear section that acts as an annulus gear of the first gear and with a sun gear section that acts as a sun gear of the second gear. A section of this component formed therebetween can be considered a connection section.

The driving torque received from the first sun gear and transmitted, in particular stepped down, by the first gear can be transmitted to the second gear by the coupling of the second sun gear to the first annulus gear. The second gear is to this extent arranged downstream of the first gear drivewise. Since the driving torque is output from the first annulus gear to the second gear, a transmission at a fixed gear transmission ratio can in particular take place by the first gear that corresponds to the speed ratio between the first annulus gear and the first sun gear. The second gear is in contrast preferably switchable to implement the at least two gear transmission ratios of the transmission gearing overall. Since the total gear transmission ratio of the transmission gearing results from the combination of the gear transmission ratio of the first gear and the gear transmission ratio of the second gear, a total gear transmission ratio that is larger in amount can be achieved by the provision of the second gear than with only one gear.

In particular the second planet carrier and the second annulus gear can be considered as the output element of the transmission gearing at which the driving torque transmitted by the transmission gearing is forwarded to the differential.

In accordance with an advantageous embodiment, the second planet carrier is connected to the differential to output the driving torque transmitted by the transmission gearing to the differential. In this case, the transmission gearing can comprise a switchable coupling apparatus by means of which the second annulus gear is selectively rotationally fixedly couplable to the first annulus gear or is fixable in a stationary manner. In other words, the coupling apparatus is adjustable between at least two positions in which one position the coupling apparatus rotationally fixedly couples the second annulus gear to the first annulus gear and in which other position the coupling apparatus fixes the second annulus gear in a stationary manner, e.g. in that it rotationally fixedly couples the second annulus gear to a housing of the transmission gearing or of the axle center transmission.

If the second annulus gear is fixed in a stationary manner, a transmission at a fixed gear transmission ratio at which the driving torque input into the second gear is then output by the second planet carrier to the differential takes place between the second sun gear at which the driving torque output by the first gear enters into the second gear and the second planet carrier. If, in contrast, the second annulus gear is rotationally fixedly coupled to the first annulus gear, it is simultaneously also couplable or coupled by it for a common rotation with the second sun gear. The planetary transmission that forms the second gear can be blocked by such a coupling so that the driving torque input into the second gear is output at a 1:1 transmission by the second planet carrier. It is possible in this manner to switch between two gear transmission ratios of the transmission gearing by means of the coupling apparatus.

In accordance with an embodiment alternative to the above-described embodiment, it is not, in contrast, the second planet carrier, but the second annulus gear that is connected to the differential to output the driving torque transmitted by the transmission gearing to the differential. In this case, the transmission gearing can comprise a switchable coupling apparatus by means of which of the second planet carrier is selectively rotationally fixedly couplable to the first annulus gear or is fixable in a stationary manner. In other words, the coupling apparatus is adjustable between at least two positions in which one position the coupling apparatus rotationally fixedly couples the second planet carrier gear to the first annulus gear and in which other position the coupling apparatus fixes the second planet carrier in a stationary manner, e.g. in that it rotationally fixedly couples the second planet carrier gear to a housing of the transmission gearing or of the axle center transmission.

If the second planet carrier gear is fixed in a stationary manner, a transmission at a fixed gear transmission ratio at which the driving torque input into the second gear is then output by the second annulus gear to the differential takes place between the second sun gear at which the driving torque output by the first gear enters into the second gear and the second annulus gear. If the second planet carrier is, in contrast, rotationally fixedly coupled to the first annulus gear, it is simultaneously also couplable or coupled by it for a common rotation with the second sun gear. The planetary transmission that forms the second gear can be blocked by such a coupling so that the driving torque input into the second gear is output to the differential at a 1:1 transmission by the second annulus gear. It is possible in this manner to switch between two gear transmission ratios of the transmission gearing by means of the coupling apparatus.

An advantage of the first-named of the two above embodiments that are alternative to one another is that it can be comparatively simpler from a construction aspect to provide a coupling apparatus by means of which the two annulus gears are couplable to one another than to provide a coupling apparatus that can rotationally fixedly couple the second planet carrier to the first annulus gear. In principle, however, the second-named embodiment can nevertheless be preferable for other reasons. The coupling apparatus can in this respect in each case be formed in a manner known per se. The coupling apparatus can, for example, be a friction-locked or a shape matched coupling apparatus, with means in particular being able to be provided for a synchronization of the coupling halves in the case of a shape matched coupling apparatus.

It is advantageous in this respect if the coupling apparatus is configured as a dog clutch and is adapted to be synchronized by the drive device to be able to be switched during travel. The synchronization can then in particular take place by accelerating the respective coupling half to a synchronous speed by means of the respective drive device. This makes it possible also to switch the coupling apparatus during a trip of the vehicle to which the axial center transmission is provided despite the use of a dog clutch that is advantageous with respect to a reliable force transmission.

In both named alternative embodiments, the respective element of the second gear that acts as the output element of the second gear and, optionally, of the total transmission gearing (that is the second planet carrier or the second annulus gear) can have a pinion for its connection to the differential or can be connected to a pinion that is in engagement with an input element of the differential for a common rotation. This input element of the differential can then in particular be a crown wheel provided at a housing or at a differential cage of the differential.

Provision can furthermore respectively be made in the two embodiments that the coupling apparatus is switchable into a neutral position in which it neither rotationally fixedly couples the respective element of the gear nor fixes it in a stationary manner, said respective element being selectively rotationally fixedly couplable to the first annulus gear or fixable in a stationary manner by means of the coupling apparatus. Provision can in particular be made that the coupling apparatus does not rotationally fixedly couple any element of the second gear to the first annulus gear in the neutral position and also does not fix any element of the second gear in a stationary manner. In the neutral position, the respective element of the second gear is thus preferably freely rotatable so that the second gear is underdetermined and can consequently not transmit any driving torque. Such an embodiment has the advantage that the drive device from which the axle center transmission receives a driving torque can be selectively decoupled from the axle to which the axle center transmission can distribute the driving torque. A drive axle can thereby be implemented that can be engaged as required even if the drive device used is self-locking, e.g. a self-locking electric motor.

In accordance with a further advantageous embodiment, the second sun gear is supported at the first planet carrier via at least one support bearing. In other words, the second sun gear is supported at the first planet carrier via the at least one support bearing. Said support bearing can in particular be the only separately provided bearing for the support of the second sun gear. In this embodiment, the fact is utilized for the support of an element of the second gear that the planet carrier of the first gear is stationary and is easily accessible from the second gear that is advantageously arranged axially adjacent to the first gear. A simple and simultaneously particularly reliable support of the second sun gear can be achieved in this manner. If the second sun gear is formed in one part with the first annulus gear, the support bearing simultaneously also contributes to the support of the first annulus gear.

It is furthermore advantageous if at least one lubricant passage is formed in the first planet carrier to axially conduct lubricant into the region between the first and second gears with respect to the preferably common axis of rotation of the two planetary transmissions. The lubricant, which can in particular be an oil, can also be a coolant or can act simultaneously as a lubricant and as a coolant. The axial extent of the two gears can be respectively defined, for example, by the region in which a toothed engagement takes place between the sun gear, the planets, and the annulus gear of the respective planetary transmission. Lubricant can move by means of said at least one lubricant passage into the region axially disposed between these two regions. Since the lubricant passage is formed in a stationary element, no complex rotary leadthroughs need to be provided for this purpose.

Said lubrication passage is moreover preferably configured to radially inwardly conduct lubricant. The lubricant passage in particular has a section within said region axially between the first and second gears through which lubricant that was axially conducted through the first gear is radially inwardly conducted. Since the first planet carrier in which the lubrication passage is formed is stationary, no centrifugal forces have to be overcome for this purpose.

Provision can in particular be made that the lubricant passage is configured to conduct lubricant to said at least one support blearing for the support of the second sun gear at the first planet carrier. For this purpose, the lubricant passage can open directly adjacent to the support bearing, e.g. at a spacing of a few millimeters, in particular at most 1 mm.

In accordance with a further advantageous embodiment, the second sun gear and the first annulus gear are coupled to one another via a connection section in which one or more lubricant conduits are formed through which lubricant can move from the first gear to the second gear. The connection section can in particular be the above-mentioned connection section of a single component acting both as an annulus gear of the first gear and as a sun gear of the second gear.

The connection section preferably has a plurality of such lubricant conduits that are arranged spaced regularly apart from one another along a circular path about a common axis of rotation of the two gears. The lubricant conduits are furthermore preferably aligned at least substantially in parallel with said axis of rotation. Lubricant can in particular move via such lubricant conduits from said support bearing at the first sun gear in a simple manner to the second sun gear.

In this respect, it is furthermore advantageous if the lubricant conduits (on sides of the second gear) open into an annular space that is formed between the second sun gear, the connection section, and the second planet carrier. One or more lubricant passages that are formed in the second planet carrier can then in turn preferably open into this annular space to conduct lubricant from the annular space to the planet gears of the second planet carrier, in particular into bearings provided for the planet gears at the planet carrier. Lubricant that enters into the annular space via the lubricant conduits can in this manner be conveyed further through the lubricant passages of the second planet carrier at least substantially radially outwardly to the planet gears. If the second planet carrier is not stationary, the conveying of the lubricant through its lubricant passages is advantageously supported by the centrifugal force resulting from the rotation of the second planet carrier.

The invention also relates to an axle drive. The axle drive in accordance with the invention comprises an axle center transmission in accordance with the invention—in particular an axle center transmission that is configured in at least one of the above-described manners—and a drive device that is connected to said input element to transmit a driving torque of the drive device to the axle center transmission. The input element can be an input element of the transmission gearing and, simultaneously or alternatively, an input element of the axle center transmission. The drive device is preferably an electric motor. Drive devices can, however, generally also be considered that are based on different principles to generate a driving torque. It can, for example, also be a hydraulic motor or also an internal combustion engine.

Provision can generally be made that the vehicle has a primary motor/engine (e.g. an internal combustion engine) differing from the drive device of the axial drive and at least one drive axle driven by the primary motor, with the axle drive then being able to serve to drive a further axle of the vehicle by means of the drive device to implement an additional drive axle. This additional drive axle is switchable due to the switchability of the axle center transmission between at least two gear transmission ratios and is preferably also switchable into a drive free state, for example via a neutral position of a coupling apparatus as has been described further above. In this manner, an engageable drive axle usable in different driving ranges and having its own drive device can be implemented.

The vehicle preferably, however, does not have an additional primary motor/engine, but is driven via one or more axle drives in accordance with the invention. To this extent, the invention also relates to a vehicle having at least two axle drives whose drive devices are each preferably electric motors and of which at least one axle drive is configured in said manner in accordance with the invention. All the axle drives are preferably configured in a manner in accordance with the invention here.

By provision of a plurality of axle drives in accordance with the invention, a stepped switching of different axles of the vehicle is made possible. Provision can in particular be made in a corresponding manner, as has been described further above, that coupling apparatus of the axle drives can each be switched into a neutral position to be able to switch drivable axles of the vehicle into a drive-free state independently of one another depending on a desire or on the driving situation.

A vehicle can specifically, for example, have two axles that are each formed as axle drives in accordance with the invention and preferably have electric motors as the respective drive device. No primary motor/engine is here provided to drive the vehicle in addition to the drive devices of the two axle drives. The two axles can then be switched in a stepped manner by means of the axle drives so that e.g. first a switching of the front axle of the vehicle can take place and then a switching of the rear axle of the vehicle or, actually conversely, first a switching of the rear axle of the vehicle and then a switching of the front axle of the vehicle.

The invention further relates to a drive axle. The drive axle in accordance with the invention comprises an axle center transmission in accordance with the invention—in particular an axle center transmission that is formed in at least one of the two manners described above—or an axle drive in accordance with the invention—in particular an axle drive that is formed in at least one of the manners described above. The drive axle therefore does not necessarily have to comprise a drive device, but the driving torque received from the axle center transmission of the drive axle can also originate from a separate drive device.

The drive axle furthermore comprises two half shafts that are each connected to one of the two said output elements to transmit a respective portion of the driving torque transmitted by the axle center transmission and distributed to the output elements. The output elements can be output elements of the differential and simultaneously, or alternatively, output elements of the axle center transmission. The two half shafts can be two oppositely aligned halves of the same axle of a vehicle at which the drive axle can be provided.

In accordance with an advantageous embodiment, the half shafts each comprise an articulated shaft and a wheel side and are configured for independent wheel suspension. The one end of the articulated shaft of a respective half shaft can then be connected to the wheel side, while the other end can be connected to a respective one of the two output elements. The wheel side can be a wheel hub and, optionally, a transmission gearing that is provided between the wheel hub and the articulated shaft and via which the driving torque transmitted by the articulated shaft to the wheel hub can be stepped down. The step-down gear unit can in particular be a planetary transmission, with the articulated shaft then preferably being connected to a sun gear of this planetary transmission.

The invention will be explained in more detail in the following only by way of example with reference to the Figures.

Figure 1A:
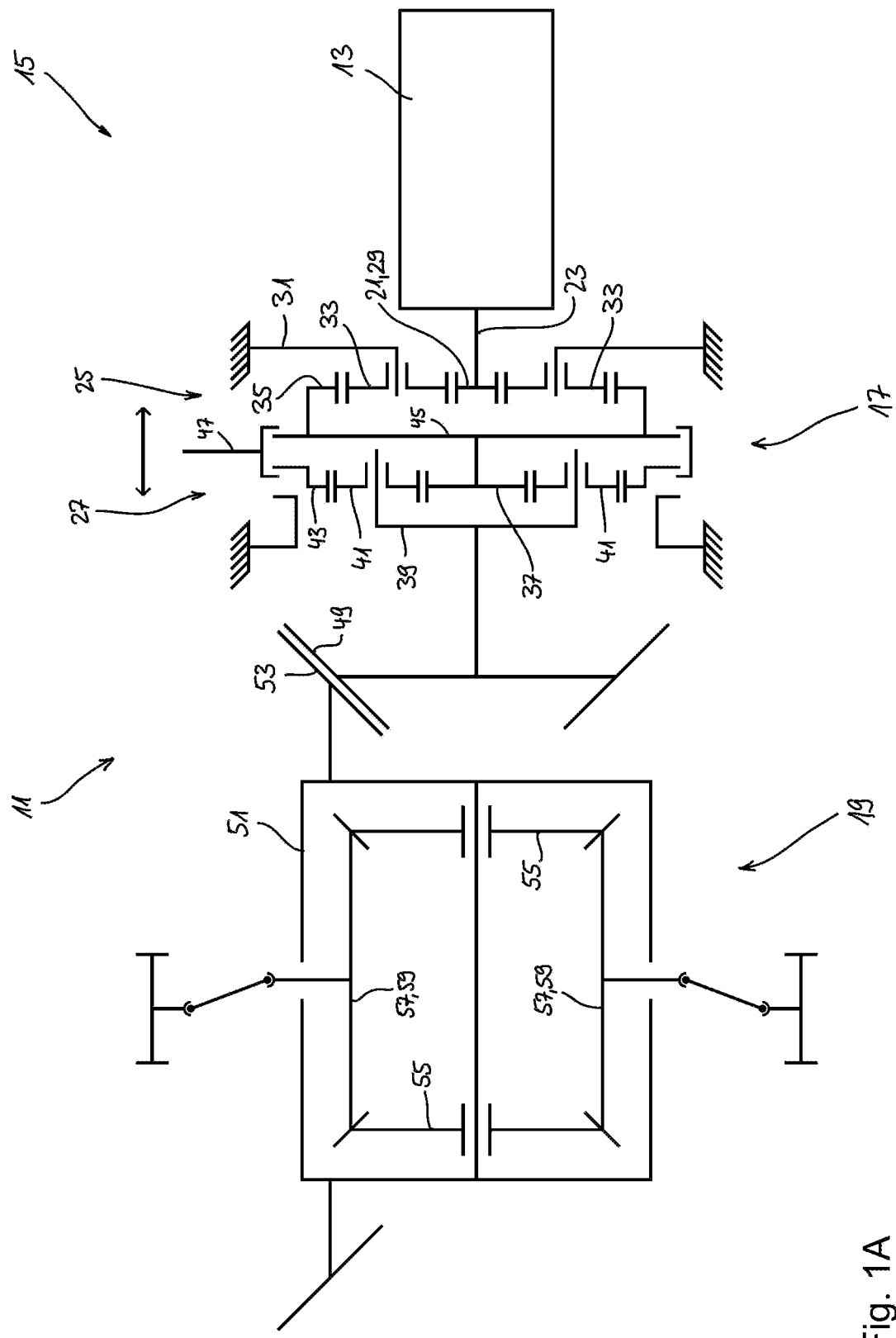
FIG. 1A shows in a schematic representation the design of an axle drive in accordance with the invention that comprises an axle center transmission in accordance with the invention.

An embodiment of an axle center transmission 11 in accordance with the invention is shown in a schematic representation in FIG. 1A. The axle center transmission 11 is connected to a drive device 13 and with it forms an axle drive for an axle of a vehicle otherwise not shown. The drive device 13 is an electric motor that is specifically provided for the drive of said axle. The vehicle can have still further axles, in particular one or more axles, preferably two, that are reach formed in a corresponding manner as the axle shown, that is have an axle drive 15 having an axle center transmission 11 in accordance with the invention and a respective drive device 13.

Figure 3:
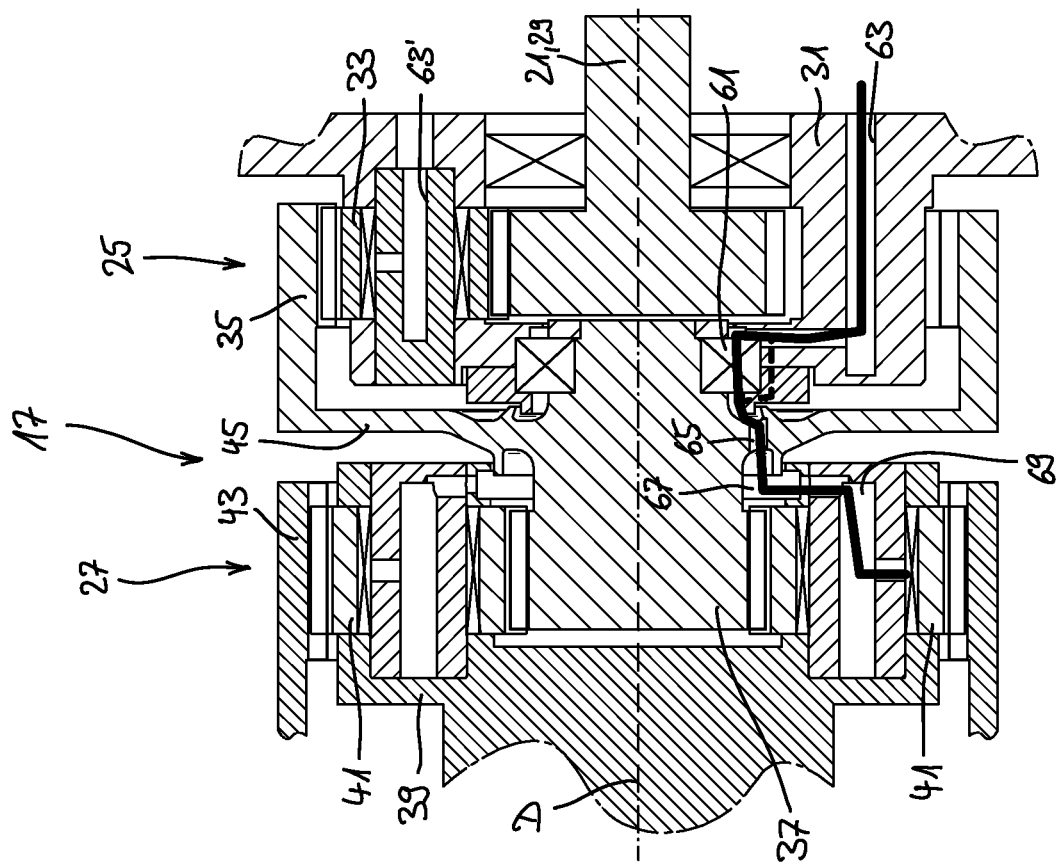
FIG. 3 shows the extent of a lubricant conveying through the embodiment shown in FIG. 2.
Figure 2:
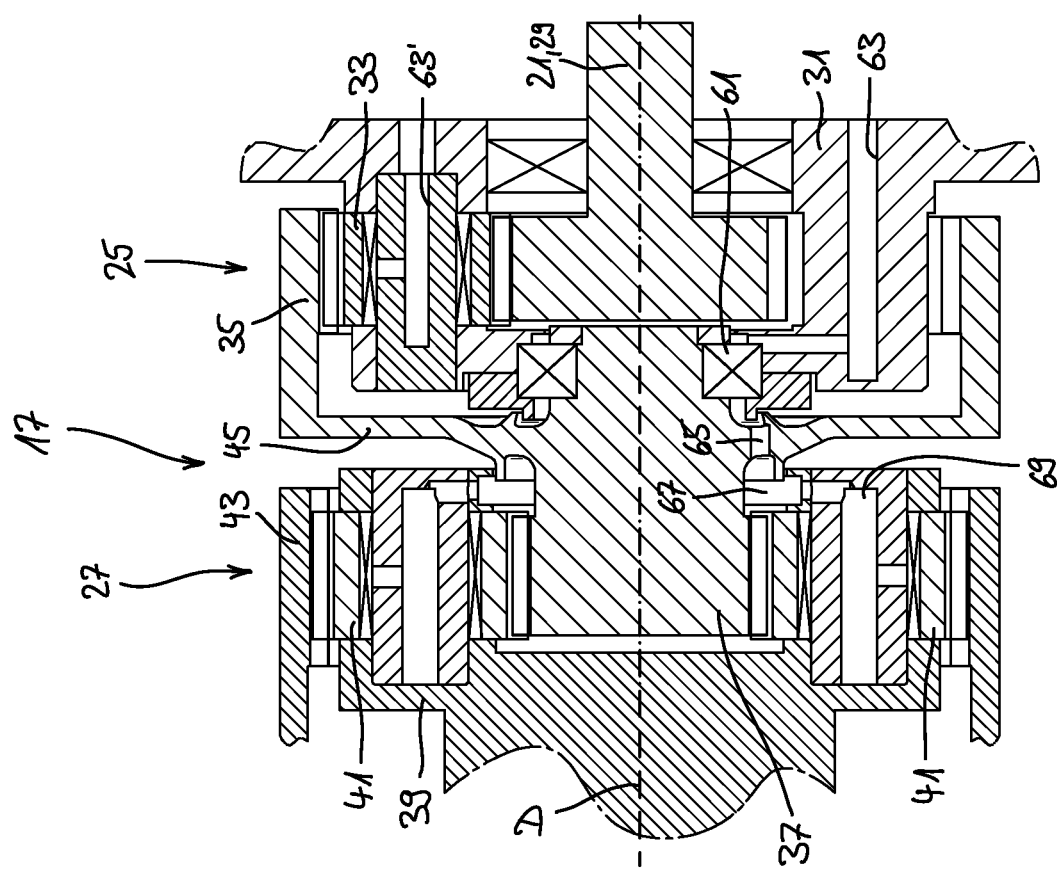
FIG. 2 shows a sectional representation through a part of an embodiment of an axle center transmission in accordance with the invention.

The axle center transmission 11 comprises a transmission gearing 17 and a differential 19. The transmission gearing 17 is connected to a drive shaft 23 of the drive device 13 by an input element 21 of the transmission gearing 17 that simultaneously acts as an input element 21 of the total axle center transmission 11. In this manner, a driving torque generated by the drive device 13 and output via the output shaft 23 enters into the transmission gearing 17 of the axle center transmission 11. The transmission gearing 17 is also shown in FIGS. 2 and 3 that show a large part of the transmission gearing 17 in a sectional representation.

The transmission gearing 17 has a first gear 25 and a second gear 27 that each comprise a planetary transmission. The planetary transmission of the first gear 25 has a first sun gear 29, a first planet carrier 31 at which a plurality of planet gears 33 are rotatably supported, and a first annulus gear 35. In a similar manner, the second gear 27 has a second sun gear 37, a second planet carrier 39 at which a plurality of planet gears 41 are rotatably supported, and a second annulus gear 43. The planetary transmissions of the first and second gears 25, 27 have a common axis of rotation D (cf. FIG. 2).

The first sun gear 29 forms said input element 21 and is rotationally fixedly coupled to the output shaft 23 of the drive device 13. The first planet carrier 31 is formed as stationary. The first planet carrier 31 is connected to a housing, not shown, of the axle center transmission 11 for this purpose. Since the planet gears 33 supported at the first planet carrier 31 are in engagement both with the first sun gear 29 and with the first annulus gear 35, a rotation of the first sun gear 33 via the planet gears 33 results in a rotation of the first annulus gear 35 such that the driving torque entering at the first sun gear 29 is transmitted to the first annulus gear 35. The gear transmission ratio at which the driving torque is transmitted here depends in a known manner on the ratios of the toothed wheels participating here. In the present embodiment, the driving torque is stepped down by the first gear 25.

The first annulus gear 35 is formed in one part with the second sun gear 37 so that the first annulus gear 35 is formed by an annulus gear section and the second sun gear 37 is formed by a sun gear section of the same component that additionally comprises a connection section 17 that is formed between the annulus gear section and the sun gear section and to this extent connects the first annulus gear 35 and the second sun gear 37 to one another.

The second sun gear 37 meshes with the planet gears 41 that are rotatably supported at the second planet carrier 39 and additionally mesh with the second annulus gear 43. The second annulus gear 43 can be selectively coupled to the first annulus gear 35 for a common rotation by means of a switchable coupling apparatus 47 or can be fixed in a stationary manner, in particular with respect to said housing of the axle center transmission 11 so that the second annulus gear 43 is blocked against a rotation. The coupling apparatus 47 can furthermore be switched into a neutral position in which the second annulus gear 43 is neither coupled to the first annulus gear 35 nor fixed in a stationary manner, but can rather rotate freely.

The second planet carrier 39 represents an output element of the transmission gearing 17 at which the driving torque transmitted by the transmission gearing 17 is output. Which transmission the driving torque transmitted by the first gear 25 is additionally subjected to by the second gear 27 depends on whether the second annulus gear 43 is fixed in a stationary manner or is coupled to the first annulus gear 35 for a common rotation and thus simultaneously also to the second sun gear 37.

With a second annulus gear 43 fixed in a stationary manner, a further stepping down of the driving torque takes place by the second gear 27 so that the total stepping down at which the driving torque is transmitted by the transmission gearing 17 is increased in amount overall. If the second annulus gear 43 is, in contrast, rotationally fixedly coupled to the second sun gear 37, the planetary transmission of the second gear 27 runs around in the block so that no additional transmission takes place and the total gear transmission ratio of the transmission gearing corresponds to the constant stepping down of the first gear 25. It is possible in this manner to switch between two different gear transmission ratios by means of the coupling apparatus 47. Almost any desired other gear transmission ratios can generally also be implemented by a corresponding configuration of the two gears 25, 27.

If the coupling apparatus 47 is set into its neutral position, no driving torque can be transmitted by the second gear 27 and thus also by the total transmission gearing 17 due to the freely rotating second annulus gear 43. The setting to neutral of the coupling apparatus 47 consequently makes it possible to decouple the drive device 13 from the respective axle of the vehicle as necessary. The axles can in this manner be either driven or only run along as required as an engageable drive axle.

The second planet carrier 39 of the transmission gearing 17 is connected to a pinion 49 via which the transmitted driven torque is transmitted to a differential cage 51 of the differential 19. The differential cage 51 has a crown wheel 43 with which the pinion 49 is in engagement for this purpose. Two compensation pinion gears 55 are rotatably supported at the differential cage 51 and in turn drive two output pinion gears 57 so that the transmitted driving torque entering at the crown wheel 53 is distributed to the two output pinion gears 57. The output pinion gears 57 can then be connected for a common rotation to a shaft, in particular an articulated shaft, of a respective half shaft of the vehicle at which the axle drive 15 is provided so that the distributed driving torque is ultimately output at the half shafts. To this extent, the output pinion gears 57 represent output elements 59 of the differential 19 and simultaneously of the total axle center transmission 11.

Since the first planet carrier 31 is stationary, the second sun gear 37 formed as a single component together with the first annulus gear 35 can be reliably supported thereat via a support bearing 61. This can be recognized in the sectional representation of FIGS. 2 and 3.

Figure 1B:
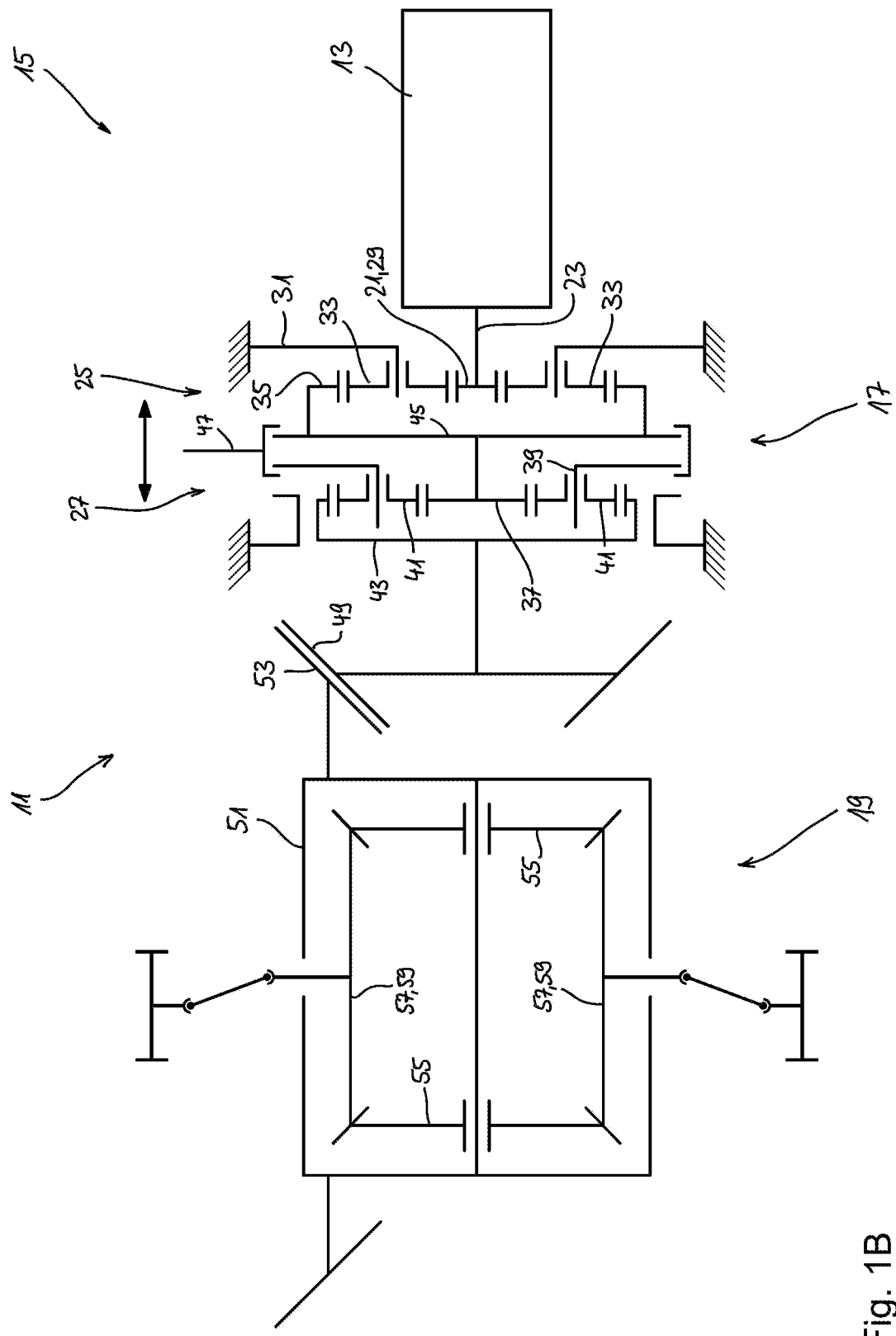
FIG. 1B shows in a schematic representation the design of an axle drive in accordance with the invention that comprises an alternative axle center transmission in accordance with the invention.

The alternative embodiment shown in FIG. 1B differs from the embodiment shown in FIG. 1A in that it is not the second planet carrier 39, but the second annulus gear 43 that is connected to the differential 19 to output the driving torque transmitted by the transmission gearing 17 to the differential 19; therefore, in this alternative embodiment, by means of the switchable coupling apparatus 47 the second planet carrier 39 is selectively rotationally fixedly couplable to the first annulus gear 35 or is fixable in a stationary manner.

The stationary first planet carrier 31 can additionally advantageously be used for the lubricant conveying. For this purpose, the first planet carrier 31 has lubricant passages 63, 63' that are connected to a lubricant pump, not shown. In this context, no rotary leadthroughs or similar have to be provided for the connection to the lubrication pump due to the stationary arrangement.

Lubricant can also be directly conducted to the planet gears 33 supported at the first planet carrier 31 and to their bearings through one or more lubricant passages 63'. In addition, lubricant can move through one or more lubricant passages 63 axially (with respect to the axis of rotation D) through the first gear 25 into the region between the toothed arrangements of the first and second gears 25, 27 and can be there radially inwardly conducted to the support bearing 61. The lubricant passages 63 can have a section for this purpose that extends substantially axially and can have a section adjoining it that extends substantially radially to the axis of rotation D, as can be recognized in FIGS. 2 and 3.

The connection section 45 between the annulus gear section acting as the first annulus gear 35 and the sun gear section of the component comprising these two elements acting as a second sun gear 37 has a plurality of lubricant conduits 65 that are arranged distributed peripherally about the axis of rotation D and that extend axially through the connection section 45. Lubricant can thereby move through the lubricant conduits 65 from the first gear 25, in particular from the support bearing 61, to the second gear 27.

The lubricant conduits 65 open into an annular space 67 that is formed between said component that has the second sun gear 37 and the connection section 45 and the second planet carrier 39. Further lubricant passages 69 that are formed in the second planet carrier 39 additionally open into this annular space 67. The lubricant can then be conducted through these lubricant passages 69 from the annular space 67 to the planet gears 41 or their bearings supported at the second planet carrier 39. Lubricant can furthermore advantageously also move from the annular space 67 into the tooth engagement between the first sun gear 37 and the planet gears 41.

The total extent of the described lubricant conveying via which the support bearing 61 and the elements of the second gear 27 can in particular be supplied with lubricant is drawn as a comparatively thicker solid line in FIG. 3 that otherwise corresponds to FIG. 2. The extent of a bypass of the lubricant flow around the support bearing 61 is moreover additionally drawn by a dashed line.

No centrifugal forces have to be overcome for this lubricant conveying since the lubricant is only radially inwardly conducted in the stationary first planet carrier and is conveyed in stationary lubricant passages 63 up to the support bearing 61. The centrifugal force can then subsequently advantageously be used to convey the lubricant radially outwardly to the bearings of the planet gears 41 via the further lubricant passages 69 after the axial passage through the lubricant conduits 65 of the connection section 45. In this manner, the lubricant conveying in the axle center transmission 11 in accordance with the invention is substantially simplified and no rotary leadthroughs or the like have to be provided to sufficiently lubricate and cool the elements of the transmission gearing 17 by means of a suitable lubricant.

REFERENCE NUMERALS 11 axle center transmission
13 drive device
15 axle drive
17 transmission gearing
19 differential
21 input element
23 output shaft
25 first gear
27 second gear
29 first sun gear
31 first planet carrier
33 planet gears
35 first annulus gear
37 second sun gear
39 second planet carrier
41 planet gears
43 second annulus gear
45 connection section
47 coupling apparatus
49 pinion
51 differential cage
53 crown wheel 55 compensation pinion gear
57 output pinion gear
59 output element
61 support bearing
63, 63' lubricant passages
65 lubricant conduit
67 annular space
69 lubricant passage
D axis of rotation

The invention claimed is:

1. An axle center transmission for transmitting a driving torque from a drive device to two half shafts of an axle of a vehicle,
    wherein the axle center transmission comprises a transmission gearing for transmitting a driving torque received at an input element and having at least two selectively switchable gear transmission ratios and a differential for distributing the transmitted driving torque to two output elements;
    wherein the transmission gearing has a first gear that is configured as a planetary transmission and comprises a first sun gear, a first planetary carrier having one or more planet gears, and a first annulus gear;
    wherein the transmission gearing has a second gear that is configured as a planetary transmission and comprises a second sun gear, a second planetary carrier having one or more planet gears, and a second annulus gear;
    wherein the first sun gear forms said input element; wherein the first planetary carrier is permanently stationary; and wherein the second sun gear is couplable or coupled to the first annulus gear for a common rotation;
    wherein the second planet carrier is connected to the differential to output the driving torque transmitted by the transmission gearing to the differential; and wherein the transmission clearing comprises a switchable coupling apparatus by means of which the second annulus gear is selectively rotationally fixedly couplable to the first annulus gear or is fixable in a stationary manner; and
    wherein the coupling apparatus is switchable into a neutral position in which it neither rotationally fixedly couples the second annulus gear to the first annulus gear nor fixes it in a stationary manner.

2. The axle center transmission in accordance with claim 1, wherein the second sun gear is supported at the first planet carrier via at least one support bearing.

3. The axle center transmission in accordance with claim 1, wherein at least one lubricant passage is formed in the first planet carrier to conduct lubricant axially into the region between the first gear and the second gear.

4. The axle center transmission in accordance with claim 3, wherein the at least one lubricant passage is configured to conduct the lubricant radially inwardly.

5. The axle center transmission in accordance with claim 3, wherein the second sun gear is supported at the first planet carrier via at least one support bearing, wherein the at least one lubricant passage is configured to conduct the lubricant to the at least one support bearing.

6. The axle center transmission in accordance with claim 1, wherein the second sun gear and the first annulus gear are coupled via a connection section in which at least one lubricant conduit is formed through which lubricant can move from the first gear to the second gear.

7. The axle center transmission in accordance with claim 6, wherein the at least one lubricant conduit opens into an annular space that is formed between the second sun gear, the connection section, and the second planet carrier; and wherein at least one lubricant passage opens into the annular space, the at least one lubricant passage being formed in the second planet carrier to conduct the lubricant from the annular space to the one or more planet gears of the second planet carrier.

8. An axle drive having an axle center transmission in accordance with claim 1 and having the drive device that is connected to the input element of the axle center transmission to transmit a driving torque of the drive device to the axle center transmission.

9. The axle drive in accordance with claim 8, wherein the drive device comprises an electric motor.

10. A drive axle having an axle center transmission in accordance with claim 1, wherein the drive axle furthermore comprises two half shafts that are each connected to one of the two output elements to receive a respective portion of the driving torque transmitted by the axle center transmission and distributed to the output elements.

11. The drive axle in accordance with claim 10, wherein the half shafts each comprise an articulated shaft and a wheel hub and are configured for independent wheel suspension.

12. The drive axle in accordance with claim 10, having the drive device that is connected to the input element of the axle center transmission to transmit the driving torque of the drive device to the axle center transmission.

13. An axle center transmission for transmitting a driving torque from a drive device to two half shafts of an axle of a vehicle,
    wherein the axle center transmission comprises a transmission gearing for transmitting a driving torque received at an input element and having at least two selectively switchable gear transmission ratios and a differential for distributing the transmitted driving torque to two output elements;
    wherein the transmission gearing has a first gear that is configured as a planetary transmission and comprises a first sun gear, a first planetary carrier having one or more planet gears, and a first annulus gear;
    wherein the transmission gearing has a second gear that is configured as a planetary transmission and comprises a second sun gear, a second planetary carrier having one or more planet gears, and a second annulus gear;
    wherein the first sun gear forms said input element; wherein the first planetary carrier is permanently stationary; and wherein the second sun gear is couplable or coupled to the first annulus gear for a common rotation; and
    wherein at least one lubricant passage is formed in the first planet carrier to conduct lubricant axially into the region between the first gear and the second gear.

14. The axle center transmission in accordance with claim 13, wherein the second annulus gear is connected to the differential to output the driving torque transmitted by the transmission gearing to the differential; and wherein the transmission gearing comprises a switchable coupling apparatus by means of which the second planet carrier is selectively rotationally fixedly couplable to the first annulus gear or is fixable in a stationary manner.

15. The axle center transmission in accordance with claim 14, wherein the coupling apparatus is configured as a dog clutch and is adapted to be synchronized by the drive device to be able to be switched during travel.

16. The axle center transmission in accordance claim 14, wherein the coupling apparatus is switchable into a neutral position in which it neither rotationally fixedly couples the second planet carrier to the first annulus gear nor fixes it in a stationary manner.

17. The axle center transmission in accordance with claim 13, wherein the at least one lubricant passage is configured to conduct the lubricant radially inwardly.

18. The axle center transmission in accordance with claim 13, wherein the second sun gear is supported at the first planet carrier via at least one support bearing, wherein the at least one lubricant passage is configured to conduct the lubricant to the at least one support bearing.

19. The axle center transmission for transmitting a driving torque from a drive device to two half shafts of an axle of a vehicle,
- wherein the axle center transmission comprises a transmission gearing for transmitting a driving torque received at an input element and having at least two selectively switchable gear transmission ratios and a differential for distributing the transmitted driving torque to two output elements;
- wherein the transmission gearing has a first gear that is configured as a planetary transmission and comprises a first sun gear, a first planetary carrier having one or more planet gears, and a first annulus gear;
- wherein the transmission gearing has a second gear that is configured as a planetary transmission and comprises a second sun gear, a second planetary carrier having one or more planet gears, and a second annulus gear;
- wherein the first sun gear forms said input element; wherein the first planetary carrier is permanently stationary; and wherein the second sun gear is couplable or coupled to the first annulus gear for a common rotation; and
- wherein the second sun gear and the first annulus gear are coupled via a connection section in which at least one lubricant conduit is formed through which lubricant can move from the first gear to the second gear.

20. The axle center transmission in accordance with claim 19, wherein the at least one lubricant conduit opens into an annular space that is formed between the second sun gear, the connection section, and the second planet carrier; and wherein at least one lubricant passage opens into the annular space, the at least one lubricant passage being formed in the second planet carrier to conduct the lubricant from the annular space to the one or more planet gears of the second planet carrier.

* * * * *

UNITED STATES PATENT AND TRADEMARK OFFICE
CERTIFICATE OF CORRECTION

| | |
|---|---|
| PATENT NO. | : 11,187,311 B2 |
| APPLICATION NO. | : 16/789673 |
| DATED | : November 30, 2021 |
| INVENTOR(S) | : Bauer |

It is certified that error appears in the above-identified patent and that said Letters Patent is hereby corrected as shown below:

In the Claims

Column 13, Line 36:
"the transmission clearing comprises a switchable cou-"
Should read:
"the transmission gearing comprises a switchable cou-"

Signed and Sealed this
Third Day of May, 2022

*Katherine Kelly Vidal*
Katherine Kelly Vidal
*Director of the United States Patent and Trademark Office*